(12) United States Patent
Taylor et al.

(10) Patent No.: US 6,228,172 B1
(45) Date of Patent: May 8, 2001

(54) TUMBLE COATING

(75) Inventors: Robert Taylor, Venelle des Platanes (BE); David G. Wardle; Mark T. Grace, both of Bridgewater, NJ (US)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 09/437,839

(22) Filed: Nov. 10, 1999

Related U.S. Application Data

(62) Division of application No. 09/181,725, filed on Oct. 29, 1998, now Pat. No. 6,007,859.

(51) Int. Cl.$^7$ ................................................. B05C 5/02
(52) U.S. Cl. ................... 118/712; 118/664; 118/708; 118/19; 118/20; 118/69; 118/303; 118/320; 118/417; 62/52.1; 62/374; 99/517; 99/487
(58) Field of Search .................................. 118/663, 664, 118/708, 712, 19, 20, 69, 303, 320, 417; 62/52.1, 374; 99/517, 455, 487; 426/302, 89, 93, 100, 231, 303, 304, 309; 427/8, 242, 398.1, 398.3

(56) References Cited

U.S. PATENT DOCUMENTS

| | | | |
|---|---|---|---|
| 3,607,313 | * | 9/1971 | Roth ........................................ 118/19 |
| 5,223,293 | * | 6/1993 | Bain ....................................... 426/305 |
| 5,911,827 | * | 6/1999 | Heller ...................................... 118/19 |

FOREIGN PATENT DOCUMENTS

| | | | |
|---|---|---|---|
| 0219471 | * | 4/1987 | (EP) . |
| 0560509 | * | 9/1993 | (EP) . |
| 0667510 | * | 8/1995 | (EP) . |

\* cited by examiner

*Primary Examiner*—Laura Edwards
(74) *Attorney, Agent, or Firm*—Joshua L. Cohen; Salvatore P. Pace

(57) ABSTRACT

In cooler used for coating a product such as food with a uniform layer of a liquid coating material, the mass of the product is measured either in the cooling chamber or just before it is introduced into the cooling chamber; the mass of a liquid cryogen which will suffice, when introduced into the cooling chamber and into contact with the product, to reduce the temperature of the mass of product to a first predetermined temperature below the melting point temperature of the coating material is calculated; the introduction of the calculated mass of liquid cryogen into the cooling chamber is controlled and the product is thereby cooled to the first predetermined temperature prior to application of a predetermined mass of coating material onto the cooled product to provide a coating thereon.

6 Claims, 1 Drawing Sheet

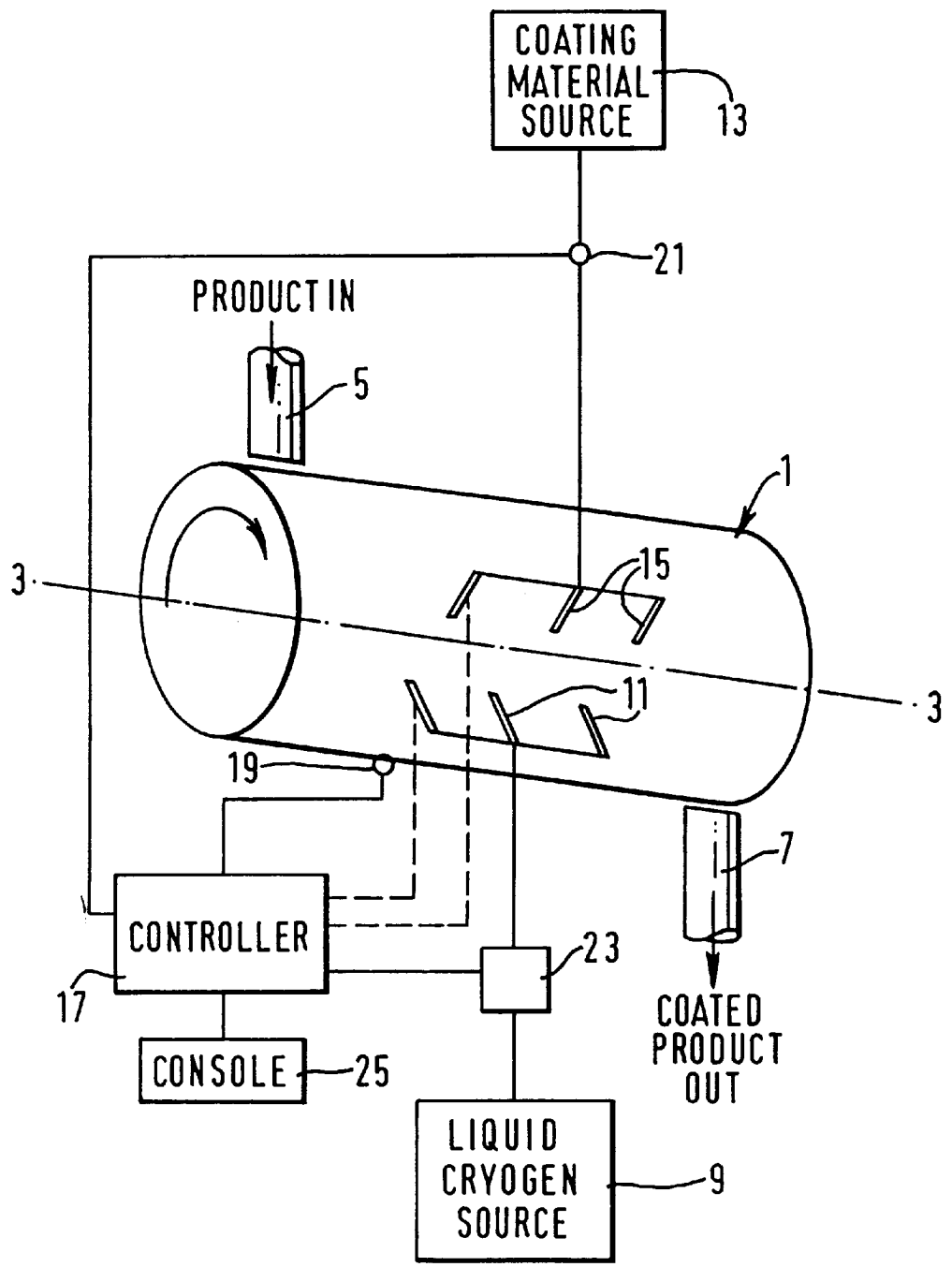

TUMBLE COATING

RELATED APPLICATIONS

This is a Divisional Application of prior application Ser. No. 09/181,725 filed Oct. 29, 1998 now U.S. Pat. No. 6,007,859.

BACKGROUND OF THE INVENTION

This invention relates to methods and apparatus for coating a product, particularly but not exclusively a food product, in a cooling chamber. In particular, the invention relates to the controlled application of a coating material to a food product within a tumble cooling apparatus.

Tumble coolers, or tumblers, are widely used and well known in the art of processing food products of the type comprising a plurality of discrete pieces or portions, such as raw meat pieces (e.g. ham or chicken nuggets), or fish (e.g. prawns, scampi, pieces of cod). The product is agitated by being "churned" in a drum which rotates about a substantially horizontal axis, whilst being sprayed with a coolant, either a liquid cryogen, such as nitrogen, or a gas at low temperature, such as carbon dioxide. The liquid cryogen mixes thoroughly with the particulate product, aided by the churning, or tumbling, effect of the rotating drum, and produces a marked reduction in the temperature of the product, to chill, freeze or "deep freeze" the product as required. Tumblers may be used to chill in batches, food being loaded in batches into the tumbler, chilled and then discharged from the tumbler, or they may be arranged as continuous cooling devices in which the food is fed into one end of the cylindrical drum, travels along the drum in an axial direction whilst being chilled and then is discharged from the other end of the drum. These two types of tumble coolers will hereafter be referred to as "batch tumblers" and "continuous tumblers", respectively (the present invention being applicable to both).

Such tumblers are now beginning to be used to apply coating materials to food products, for example coating materials such as flavored oils, sauces, batters and so on. This is accomplished by cooling the food product to a temperature substantially below the freezing point of the coating material and then spraying the coating material into the still-rotating tumbler and onto the churning food product so that the coating material freezes and adheres to the food product. Again, the continuous agitation of the food product helps to ensure that an even coating is applied, and also to prevent agglomeration of the product. A typical application would be to cool vegetable pieces to about −50° C. for a sauce with a freezing point of −3° C.; the sauce is then applied to the vegetables during tumbling (but usually whilst spraying with liquid cryogen has ceased) until a fairly even coating is produced.

When using a tumbler for coating a product, the cooling of the product has to be to the correct temperature, uniform and homogeneous, so as to ensure that each product piece is coated evenly and that all product pieces are coated to the same extent. If the product is too warm, the coating material does not freeze quickly enough to adhere firmly to the product. If the product is too cold, the coating material tends to freeze too fast, so that droplets of coating material larger than are desirable for an even coating accumulate on the surface of the product. If the product is much too cold, the coating material can freeze to, but subsequently de-bond from, the product due to the thermal contraction of the coating. If the core is very much too cold, the coating and/or the product may become brittle and break up due to the mechanical stresses produced by the churning of the tumbler, or simply as a result of the thermal stresses produced in the coating and/or the product.

The conventional methods used to control cooling in processes in which the tumbler is used for chilling/freezing only, such as timed application of liquid cryogen, controlled spray pressure and temperature feedback (i.e., adjusting liquid cryogen input in accordance with the temperature of the cryogen vapour leaving the tumbler) are unsuitable for tumble coating applications, since they are too coarse, and cannot produce a consistently uniform and properly adherent coating.

It is an aim of the present invention to overcome or ameliorate at least one of the disadvantages of the prior art, and hopefully to provide an effective method of tumble coating which is something of an improvement over the prior art.

SUMMARY OF THE INVENTION

The present invention provides a method of coating a food product with a liquid or liquefied coating material in a cooling chamber comprising the steps of: measuring the mass of product in the cooling chamber; calculating the mass of a liquid cryogen which will suffice, when introduced into the cooling chamber and into contact with the product, to reduce the temperature of the mass of product to a first predetermined temperature below the melting point temperature of the coating material; controlling the introduction of the calculated mass of liquid cryogen into the cooling chamber and into contact with the product thereby to cool the product to the first predetermined temperature, and applying a predetermined mass of coating material onto the cooled product to provide a coating thereon. The product is preferably a food product, and preferably comprises a plurality of individual pieces (ideally of about the same size).

BRIEF DESCRIPTION OF THE DRAWINGS

FIG. 1 is an elevational view of tumbling apparatus in accordance with the present invention with the control system schematically represented.

DETAILED DESCRIPTION OF THE INVENTION

The method of the present invention not only enables accurate and consistent control of the cooling of the product, thus ensuring uniform product coating, but also significantly minimizes liquid cryogen wastage, because a precise mass of cryogen is calculated and used. The principle of balancing the masses of the product and of the liquid cryogen with their thermal properties in order to provide an optimum cooling process is most advantageously applied to the coating step. Knowing the start and desired end temperatures of the product and the coating material, and the thermal characteristics of each, it is possible to arrive at a mass of coating material which, when applied to the product in the tumbler, will provide an optimum coating whilst maintaining an acceptable process time. Moreover, because the invention depends on the application of only sufficient liquid cryogen or coating material to reach a predetermined temperature, there is no need to attempt to measure accurately the product temperature in order to establish control of the coating process, although the temperature of the cryogen vapor leaving the tumbler can be monitored simply as a check that the cooling process is operating correctly. Furthermore, because the coating thickness can be accurately controlled, to produce a uniform and well-adhered coating of specified thickness, the method of the present invention can be repeated, or iterated, so as to build up layers of coating material until a desired thickness of coating, of precise specification, (and successive layers may be of a different type of coating material) is reached.

The cycling of the product between minimum and maximum coating temperatures (the first and second predetermined temperatures), using the liquid cryogen to lower the product temperature to the minimum and adding coating material such that the mean temperature of the coated product rises no further than the maximum temperature, enables the reliable and repeatable control of the coating process, to provide uniform, well-adhered coating layers, each of accurate thickness. Not only does the present invention make it possible to minimize wastage of coating material, it is also possible to take into account the increasing mass of coated product after each coating step thereby to minimize both the number of coating steps and the overall time required to produce a given coating thickness.

The product mass may conveniently be measured in the chamber, or alternatively by measuring the mass of product loaded into the chamber—the mass(es) of the coating material(s) similarly being measured or known at the point of introduction into the chamber.

Preferably, the step of controlling the introduction of the calculated mass of liquid cryogen comprises introducing the calculated mass of liquid cryogen into an intermediate dosing tank, and discharging the liquid cryogen from the dosing tank into the cooling chamber, the rate of liquid cryogen discharge being controlled by valve means.

Using a relatively small dosing, or buffer, tank for the liquid cryogen which includes a means for measuring its contents (e.g., by mounting the tank on load cells, or a capacitance gauge, differential pressure gauge or even a float-based device), any desired mass/thermal balance control strategy can be achieved by a suitable program of filling and discharging the tank.

Alternatively, the step of controlling the introduction of the calculated mass of liquid cryogen comprises measuring the mass flow rate of liquid cryogen and actuating valve means in response to the measured mass flow rate in order to vary the rate at which liquid cryogen is introduced into the cooling chamber As is known the measurement of flow of liquid cryogens is problematic due to the fact that it is difficult to maintain single phase flow. Liquid nitrogen, for example, boils at −196° C. and hence, unless very complex and expensive refrigeration means are employed, the liquid tends to boil off when being passed along a transportation pipe thus creating a two phase flow of liquid and vapor. When both liquid and vapor are present, standard flow measurement methods such as measuring the pressure drop across a calibrated orifice are inaccurate. However, by separating the two phases the flow of each phase can be measured accurately using relatively standard techniques, to give an accurate overall flow measurement of the recombined phases and thus very accurate control of the cooling of the product in the tumbler.

The predetermined mass of coating material to be added to the pre-cooled product is preferably that mass which, when added to product at the first predetermined temperature, will raise the mean temperature of the product and the coating material to a second predetermined temperature below the melting point temperature of the coating material (and above the first predetermined temperature).

Although this may not produce the desired thickness of coating in one step, it ensures that the mean temperature does not rise over that which might lead to spoilage of either the food product or the coating, or to detachment of the coating from the product. Since the second predetermined temperature is lower than the melting point temperature this also prevents adhesion between and agglomeration of the coated products.

For rapid, even cooling, the liquid cryogen should be sprayed onto the product where the product is moving most rapidly. In most tumblers there is a zone where the tumbler produces a wall of falling product. If liquid cryogen is sprayed onto this surface, high rates of liquid cryogen injection can be safely used as the rate of refreshment of product surface is high so that over freezing does not occur. The gas evolved from the liquid cryogen as it evaporates on contact with the product surface flows through the falling product providing some cooling to the product that is not directly contacted by the liquid cryogen spray. With a good product mixing action in the tumbler very high rates of heat transfer and even cooling can be achieved without damaging the product due to excessive rotations of the tumbler. A typical liquid cryogen injector would consist of one or more spray nozzles mounted near the centreline of the tumbler targeting the wall of falling product, many spray patterns can be used including a simple open ended pipe through to flat, hollow cone, square, full cone and spiral nozzles.

To ensure rapid and even coating, the coating material is generally sprayed at the same product target area as is the liquid cryogen for cooling the product. The coating material is usually liquid at ambient temperatures, and may consist of a single component but will generally comprise two or more components, being in the form of an emulsion, dispersion, slurry or solution. Solid coating materials, such as fats, may be applied at an elevated temperature (above melting point) for ease of application. For coatings that contain solid materials, such as spices or pieces of vegetables, spray nozzle(s) must be used which provide a reliable spray performance. The viscosity of the coating material may be such that pumping is difficult at ambient temperatures, in which case the coating material may be heated to a temperature at which its viscosity is sufficiently low to enable it to be pumped to the spray dispensing nozzle(s).

For very thick coatings, air atomization nozzles may greatly improve the coating quality, by producing droplets of coating much smaller than is possible using hydraulic atomizing nozzles at low to medium pressures. The small droplets possible with air atomization enable thin, uniform coatings to be produced when the viscosity of the coating material is high.

In order to provide the optimum thickness and uniformity of coating, which might be critical in some applications, the introduction rate for the coating material and the product surface ratio replacement rate (a factor of the tumbler design and operating speed) must not be too high.

As stated above, the method of the invention may be repeated, or iterated, in order to provide a desired coating thickness in several layers. Alternatively, different coating materials may be applied, so as to provide successive layers of accurate and uniform thickness and of different coating materials on the product, which might be highly desirable for some food products. A final process might be the injection of water or other materials to improve the surface appearance of the coated product. The injection of steam, for example, can provide an attractive glazing to a product without requiring the addition of large amounts of water. After the coating of the product is complete, the coated product will normally be at the second predetermined temperature. Although this temperature is below the melting point temperature of the coating material, it may not be the optimum temperature for subsequent processing of the product (e.g., packaging). If this is the case, it is a relatively simple process to apply a further calculated amount of liquid cryogen to reduce the temperature of the coated product to that required for subsequent processing.

In view of the foregoing description of the invention it will be appreciated that, in another aspect, the invention also provides apparatus for coating a food product with a liquid or liquefied coating material comprising a tumble cooler including means for spraying product in the cooler with a liquid cryogen; means for spraying product in the cooler with the coating material; means for controlling the introduction into the cooler and into contact with the product of a mass of liquid cryogen calculated to reduce the temperature of the product to a first predetermined temperature below the melting point temperature of the coating material, and by means for applying a predetermined mass of coating material onto the cooled product to provide a coating thereon with a means being provided to measure the mass of the product in the cooler For the avoidance of doubt, the term "liquid cryogen" means any highly volatile fluid that by and large exists as a vapor at atmospheric temperatures and pressures, but which, in the practice of the invention, is cooled and/or pressurized such that it is in large part in the liquid phase. Preferably the liquid cryogen is an atmospheric gas, such as nitrogen, however the liquid cryogen could equally be carbon dioxide or the respirable gas mixture sold under the Applicants' own trade mark SLA. Also for the avoidance of doubt, the term "liquid or liquefied coating material" as used herein—particularly in the claims—includes any coating material which, when dispensed for coating, is in large part liquid. Thus the term embraces, for example, emulsions, liquids containing solid particles and/or dissolved gases (such as might be introduced to enhance the aroma and/or flavor of the coated product) and mixtures of these.

The invention will now be described by way of example and with reference to the accompanying schematic drawing of an apparatus for carrying out the method in accordance with the invention, and to the worked Example.

FIG. 1 shows a cylindrical tumbler 1 adapted to rotate about an axis 3—3. As is known in the art, axis 3—3 can be slightly inclined from the horizontal so that product loaded into the tumbler 1 at inlet 5 gradually moves along the tumbler to a product outlet 7, thus forming a continuous tumbler. Alternatively, in a batch tumbler the axis 3—3 is horizontal so that the tumbler is loaded and unloaded via a single opening (not shown). The rotation of the tumbler 1 continually agitates and mixes the product, aided by paddles and the like within the tumbler (not shown) as is known in the art, as it moves through the tumbler 1 and towards outlet 7.

To cool the product in the tumbler 1, liquid nitrogen from a source 9 thereof is discharged into the tumbler 1 and directly onto the product, through spray nozzles 11. To coat the cooled product in the tumbler 1, coating material from a source 13 thereof is discharged into the tumbler 1 and directly onto the product through spray nozzles 15. The rate of spray discharge through nozzles 11 and 15 is controlled by controller 17 (for clarity, the control lines for only two nozzles are shown), which also receives signals from a sensor 19 for measuring the mass of the product in the tumbler 1, a flow meter 21 for measuring the mass flow rate of coating material from the source 13 and into the tumbler 1 and from a device 23 in the supply line between the liquid cryogen source 9 and the spray nozzles 11. Device 23 is either a dosing tank or a liquid cryogen mass flow meter. Sensor 19 may be a load cell and located as illustrated, or it may be a mass measuring device (not shown) located on the inlet 5 so as to measure the amount of product loaded into the tumbler 1, the mass of the coated product being easily calculable from the original mass of product loaded into the tumbler and the known mass(es) of coating material(s) supplied.

Operation of the illustrated apparatus is as follows. Data such as the nature of the product (eg its temperature at the inlet 5 and its specific heat capacity) the nature of the coating material (eg its temperature as it arrives at the spray nozzles 15, its freezing point temperature, its specific heat capacity above and below freezing and its latent heat of freezing) and coating characteristics (eg the lowest temperature to which the product may be reduced (which is the first predetermined temperature referred to above), the optimum maximum frozen temperature (OMFT—the maximum temperature which the coated product may be allowed to reach, which is the second predetermined temperature referred to above), the required output temperature of the coated product and the weight of coating required (a function of the average size of the product, the desired coating thickness and the coating material density) are entered into the controller 17 via a console 25.

Controller 17 then takes the measured weight of product in the tumbler (measured by sensor 19), calculates the mass of liquid cryogen necessary to cool it to the first predetermined temperature and then controls the operation of spray nozzles 11 to control the rate of introduction of liquid cryogen into the tumbler 1. This control is effected through device 23, either by filling and discharging the dosing tank in a programmed way to provide relatively coarse mass flow rate control, or utilising the measurements from a liquid cryogen mass flow meter, such as that disclosed in our European patent application number 0667510 A1 to provide particularly accurate control of the mass flow rate.

Once the calculated mass of liquid cryogen has been discharged onto the product, and the product is at the first predetermined temperature, the controller 17 actuates the spray nozzles 15 to allow coating material to spray onto the cooled product and provide a layer of coating thereon. The flow of coating material into the tumbler 1 is measured by flow meter 21, and controller 17 stops spraying from the nozzles 15 when the predetermined mass of coating material has been applied to the product.

The process effected by controller 17 will be more readily understood with reference to the following example set forth in Table 1, which cooked beef strips are coated with a cream based sauce in a batch tumbler.

TABLE 1

| COLD COATING EXAMPLE | |
|---|---|
| Core Product Properties | Cooked Beef |
| Mass of Initial Product | 70 kg |
| Temperature of Initial Product | −21° C. |
| Product Size | 30 × 10 × 5 mm strips |
| Specific Heat (Below Freezing) | 1.67 kj/kg |
| Coating Material Properties | Cream Sauce |
| Input Temperature | 11° C. |
| Specific Heat Above Freezing | 3.6 kj/kg |

TABLE 1-continued

COLD COATING EXAMPLE

| | |
|---|---|
| Freezing Point | −6° C. |
| Latent Heat of Freezing | 225 kj/kg |
| Specific Heat Below Freezing | 1.88 kj/kg |
| Air Atomisation Required Y/N? | N |
| Optimum Maximum Frozen Temperature (OMFT) | −15° C. |
| Heat Load From Input to OMFT | 303 kj/kg |
| Minimum Adhesion Temperature | −45° C. |
| Process Requirements | |
| Coating Pick Up | 100%* |
| Controlled LN** Flow Rate | 10 kg/min |
| Tumbler Speed | 6 rpm |
| Average Coating Flow Rate | 5 kg/min |
| Final Temperature | −25° C. |

*ie. Final coated product weight to be 140 kg
**LN = Liquid Nitrogen
Comments

Sauce sprays without air atomisation.
−25° C. required to allow for warming during packing.
No final surface coating required.
Thermal Balance Calculation

| | |
|---|---|
| Total Cooling Required for Core | 467.6 kj |
| Total Cooling Required for Coating | 22,534 kj |
| TOTAL | 23,002 kj |
| Factors | |
| Overall LN Efficiency Factor | 225 kj/kg* |
| Coating Heat Balance Efficiency | 85%* |
| Theoretical Minimum Process Time. | 26 min |
| *Based on Trial Experience | |
| Estimated LN Consumption | 120 kg |
| LN Ratio for Final Product | 0.86 kgLN/kg product |

MINIMUM PROCESSING CYCLE CALCULATION

The mass balance calculations for cycles of maximum coating depth achievable between the minimum adhesion temperature and the OMFT are set forth as follows in Table 2:

TABLE 2

| | |
|---|---|
| Cycle 1 | |
| Cooling of core product | 2,806 kj |
| Cold sink availability from core product | 3,507 kj |
| Maximum LN injection for cycle 1 | 12 kg |
| Maximum Coating injection for cycle 1 | 10 kg |
| Maximum Coating Pick Up | 14% |
| Specific heat of cycle 1 product | 1.70 kj/kg |
| Mass of cycle 1 product | 80.0 kg |
| Cycle 2 | |
| Cooling of cycle 1 product | 4,062 kj |
| Cold sink availability from core product | 4,062 kj |
| Maximum LN injection for cycle 2 | 18 kg |
| Maximum Coating injection for cycle 2 | 13 kg |
| Maximum Coating Pick Up | 33% |
| Specific heat of cycle 2 product | 1.72 kj/kg |
| Mass of cycle 2 product | 93.2 kg |
| Cycle 3 | |
| Cooling of cycle 2 product | 4,817 kj |
| Cold sink availability from core product | 4,817 kj |
| Maximum LN injection for cycle 3 | 21 kg |
| Maximum Coating injection for cycle 3 | 16 kg |
| Maximum Coating Pick Up | 56% |
| Specific heat of cycle 3 product | 1.75 kj/kg |
| Mass of cycle 3 product | 109.1 kg |
| Cycle 4 | |
| Cooling of cycle 3 product | 5,714 kj |
| Cold sink availability from core product | 5,714 kj |
| Maximum LN injection for cycle 4 | 25 kg |
| Maximum Coating injection for cycle 4 | 19 kg |
| Maximum Coating Pick Up for cycle 4 | 83% |
| Specific heat of cycle 4 product | 1.77 kj/kg |
| Mass of cycle 4 product | 128.0 kg |
| Cycle 5 | |
| Cooling of cycle 4 product | 6,777 kj |
| Cold sink availability from core product | 6,777 kj |
| Maximum LN injection for cycle 5 | 30 kg |
| Maximum Coating injection for cycle 5 | 12 kg |
| Maximum Coating Pick Up for cycle 5 | 100% |
| Specific heat of cycle 5 product | 1.78 kj/kg |
| Mass of cycle 5 product | 140.0 kg |
| LN to cool to final Temperature (−25° C.) | 13 kg |

As can be appreciated therefore, in order to attain the desired 100% (70 kg) coating, six cooling cycles and five coating cycles were required. In practice, this took about 34 minutes, due to the delays between cycles (in a later test, improvements to the basic injection and other techniques have enabled a 150% coating to be applied in as little as 16.5 minutes). Alternatively, a larger number of smaller coating steps can be used (i.e., applying less than the maximum amount of coating material each cycle) but this increases the overall processing time.

Of course, the invention has very many applications in the food field, for example the coating of meat (cooked or raw), fish, vegetable and pasta products with all manner of coating materials, such as flavored oils, sauces, batters and breadcrumbs, can all be carried out following the principles of this invention. In fact, provided the mean size (i.e., the product piece diameter, or at least the mean maximum dimension of the product pieces) of the product pieces lies between about 1 mm and 200 mm, and preferably between about 1 mm and 75 mm, then almost any such product can be coated with one or more layers; of course, within this size range the preferred size is wholly dependent on the nature of the product to be coated. For example, peas have a particular shape and finite size range, whereas other products such as pasta or meat chunks, chicken breasts or spare ribs have completely different shapes and a huge variety of sizes, and therefore the preferred size of food products to be coated in accordance with the invention should be understood to be the usual maximum size of that particular food product (provided its maximum dimension falls within the range of about 1 mm to about 200 mm). The method of the invention has already proved effective when performed on such food products as cooked beef strips, chicken breasts, spare ribs and peas, which, respectively, have a maximum dimension in the region of 30 mm (see Example), 150 mm, 200 mm and 5 mm.

In addition to the above-mentioned food products, it will be appreciated that a very wide range of products can be coated with the method of this invention. Food products particularly suited to such coating include vegetables, such as peas, sprouts or cauliflower pieces (coated in gravy or cheese or white sauce, for example), fruit, such as strawberries, apple chunks or cherries (coated in e.g., layers of yogurt or cream), confectionery, such as sweets or ice cream pieces (coated in eg. layers of chocolate or yogurt), or food ingredients such as granular salt or sugar (coated with a protective material, for example). Products other than food with which the present coating method may beneficially be used include chemicals and pharmaceuticals, coated with a protective and/or pleasant-tasting layer(s), for example. Numerous other specific examples will occur to those in the art seeking to provide a layer of coating material to a product, whether the coating be for aesthetic, gastronomic and/or protective purposes. Similarly, it will be realized that a very broad range of coating materials can be applied.

Having described an embodiment of tumble cooling apparatus suitable for performing one example of applying a coating material in accordance with the invention, numerous modifications will be apparent to those skilled in the art. For example, several sets of nozzles may be provided, so as to spray different coating materials to provide successive layers of different coating materials on the product, and cryogens other than liquid nitrogen may be used, as described above. Further, an apparatus may comprise a single rotary tumbler, with regions for spray coating with one or more coating materials, or there may be a series of two or more linked tumblers, the product being chilled and coated with one layer of coating material in each. The latter arrangement would be preferred, as it is more capable of preventing 'spent' cryogen leaking into an adjacent processing region and adversely affecting that process; instead, cryogen is easily exhausted from each chilling region. Furthermore, although the invention has been described in connection with a tumble cooling apparatus, it is equally applicable to other types of apparatus. For example, the method of coating in accordance with the invention can be used with mixing machines, such as those described in EP-A-219471 or EP-A-560509, which run at high speed and form an almost fluidized zone of material which can be coated in exactly analogous manner as the tumbling "curtain" of material in a tumbler apparatus; those skilled in the art will understand that, in such mixing machines, cooling of the product may not be necessary or required.

We claim:

1. An apparatus for coating a product with a liquid or liquefied coating material comprising a cooler having a means for introducing therein a product to be cooled further comprising: a means for spraying the product in the cooler with a liquid cryogen; a means to measure the mass of the product in the cooler; a means to calculate the mass of liquid cryogen sufficient to reduce the temperature of the mass of the product to a first predetermined temperature below the melting point temperature of the coating material; a means for controlling the introduction of the liquid cryogen into the cooler; and a means for applying a predetermined mass of coating material onto the cooled product to provide a coating thereon.

2. An apparatus according to claim 1 further comprising a means for measuring the mass flow rate of liquid cryogen introduced into the cooler and a valve means, actuable in response to the measured mass flow rate of liquid cryogen in order to vary the rate at which liquid cryogen is applied onto the product in the cooler.

3. An apparatus according to claim 2 wherein the mass flow rate measuring means comprises separation means for separating the liquid cryogen into a liquid portion and a gaseous portion, means for measuring the flow rate of at least the liquid portion and means for recombining the liquid portion and gaseous portion prior to introduction of the liquid cryogen into the cooler.

4. An apparatus according to claim 1 wherein the means for applying a predetermined mass of coating material further comprises a means for calculating the mass of the liquid coating material which, when added to the product at a first predetermined temperature, will raise the mean temperature of the product and the coating material in the cooler to a second predetermined temperature below the melting point temperature of the coating material.

5. An apparatus according to claim 4 wherein the applying means further comprises a means for controlling the rate of introduction of the coating material into the cooler for application onto the product.

6. An apparatus according to claim 1 wherein the means for applying a predetermined mass of the coating material comprises a plurality of means for spraying at least two different coating materials onto the product in the cooler.

* * * * *